United States Patent [19]

Burger et al.

[11] Patent Number: 4,777,634
[45] Date of Patent: Oct. 11, 1988

[54] DEMULTIPLEXER OF A DIGITAL SIGNAL TRANSMISSION APPARATUS

[75] Inventors: Erich Burger, Germering; Martin Mueller, Munich; Theodor Schwierz, Klingen, all of Fed. Rep. of Germany

[73] Assignee: Siemens Aktiengesellschaft, Berlin and Munich, Fed. Rep. of Germany

[21] Appl. No.: 37,861

[22] Filed: Apr. 13, 1987

[30] Foreign Application Priority Data

Apr. 14, 1986 [DE] Fed. Rep. of Germany ....... 3612493

[51] Int. Cl.$^4$ .............................................. H04J 3/06
[52] U.S. Cl. .................................. 370/102; 375/112
[58] Field of Search ............... 370/101, 101, 102, 108; 375/102, 106, 103, 107, 108, 112

[56] References Cited

U.S. PATENT DOCUMENTS

| | | | |
|---|---|---|---|
| 3,985,961 | 10/1976 | Voss et al. | 370/102 |
| 4,002,844 | 1/1977 | Doussoux | 370/102 |
| 4,053,715 | 10/1977 | Drapkin | 370/102 |
| 4,058,683 | 11/1977 | Fenoglio | 370/102 |
| 4,489,421 | 12/1984 | Burger | 375/112 |
| 4,669,080 | 5/1987 | Aveneau | 370/101 |
| 4,674,088 | 6/1987 | Grover | 370/100 |
| 4,688,233 | 8/1987 | Nishinaki et al. | 375/112 |

FOREIGN PATENT DOCUMENTS 2839893 3/1980 Fed. Rep. of Germany .
1384801 2/1975 United Kingdom .
1578553 11/1980 United Kingdom .

OTHER PUBLICATIONS

Kühne et al, "Positiv-Null . . . Datensignale", Frequenz, vol. 32, No. 10, 1978, pp. 281-287.

Primary Examiner—Robert L. Griffin
Assistant Examiner—Stephen Chin
Attorney, Agent, or Firm—Hill, Van Santen, Steadman & Simpson

[57] ABSTRACT

A method for the recovery of a plesiochronic data signal is provided, whereby the received sum signal generated upon application of what is referred to as pulse stuffing is divided into a synchronous data signal and into an additional data signal in a demultiplexer. A data bit likewise transmitted in the additional data signal is inserted into the synchronous data signal in a format converter on the basis of stuffing information transmitted in the additional data signal or, respectively, a bit is purged from the synchronous data signal. The stuffing information is composed exclusively of phase words which, in digital form, contain the momentary phase relationship between the sum signal and the plesiochronis data signal. A command evaluation stage forwards control signals to the format converter when the extreme values of the phase words are transgressed, the bits being inserted into the synchronous data signal or, respectively, purged from the synchronous data signal by way of the control signals.

10 Claims, 5 Drawing Sheets

FIG 3

| PW | PB4 $2^3$ | PB4 $2^3$ | ZD PB4 $2^3$ | PB3 $2^2$ | PB2 $2^1$ | PB1 $2^0$ | MPB4 A(BW) | PB3 $\oplus$ MPB4 (XO1) | UP |
|----|-----|-----|-----|------|------|------|------|------|------|
| 10 | 1 | 1 | 1 | 0(1) | 1(0) | 0(1) | 1 | 1 | |
| 11 | 1 | 1 | 1 | 0(1) | 1(0) | 1(0) | 1 | 1 | |
| 12 | 1 | 1 | 1 | 1 | 0 | 0 | 1 | 0 | N ≙ 1 |
| 13 | 1 | 1 | 1 | 1 | 0 | 1 | 1 | 0 | |
| 14 | 1 | 1 | 1 | 1 | 1 | 0 | 1 | 0 | ↑ PURGE |
| 15 | 1 | 1 | 1 | 1 | 1 | 1 | 1 | 0 | |
| 0 | 0 | 0 | 0 | 0 | 0 | 0 | 0 | 0 | ↓ STUFF |
| 1 | 0 | 0 | 0 | 0 | 0 | 1 | 0 | 0 | |
| 2 | 0 | 0 | 0 | 0 | 1 | 0 | 0 | 0 | |
| 3 | 0 | 0 | 0 | 0 | 1 | 1 | 0 | 0 | |
| | | | | | | | | | V ≙ 0 |
| 4 | 0 | 0 | 0 | 1(0) | 0(1) | 0(1) | 0 | 1 | |
| 5 | 0 | 0 | 0 | 1(0) | 0(1) | 1(0) | 0 | 1 | |
| 6 | 0 | 0 | 0 | 1(0) | 1(0) | 0(1) | 0 | 1 | |
| 7 | 0 | 0 | 0 | 1(0) | 1(0) | 1(0) | 0 | 1 | |
| 8 | 1 | 1 | 1 | 0(1) | 0(1) | 0(1) | 1 | 1 | N ≙ 1 |
|   | 1 | 1 | 1 | 0(1) | 0(1) | 1(0) | 1 | 1 | |

DEMULTIPLEXER OF A DIGITAL SIGNAL TRANSMISSION APPARATUS

BACKGROUND OF THE INVENTION

1. Field of the Invention

The present invention is directed to a method for the recovery of a plesiochronic data signal in a demultiplexer of a digital transmission system, whereby the received sum signal which was generated in a transmitted digital signal transmitter, upon application of what is referred to as pulse stuffing, is divided into a synchronous data signal and into an additional data signal in a demultiplexer, whereby a data bit likewise transmitted in the additional data signal is inserted into the synchronous data signal in a format converter on the basis of a stuffing information transmitted in the additional data signal or, respectively, a bit is extracted from the synchronous data signal, and whereby a plesiochronic clock sequence is formed in a clock recovery stage, that plesiochronic data signal being read from the format converter with the plesiochronic clock sequence.

2. Description of the Prior Art

A digital signal transmission apparatus, for example in the periodical Frequenz, Vol. 32, No. 10, 1978, pp. 281–287, in the article entitled "Positiv-Null-Negativ-Stopftechnik fuer die Multiplexübertragung plesiochroner Datensignale" combines a plurality of digital signals of one hierarchy level into a digital signal of the next-higher hierarchy level, what is referred to as a sum signal. The bit rates and the pulse frames of the digital signals of the individual hierarchy levels are defined in international agreements. Transmission is thereby plesiochronic in all levels, i.e. the bit rates of the digital signals can upwardly or downwardly deviate from their nominal values by a maximum of a tolerance value. The relative tolerances are likewise defined. An n-channel transmission equipment for a n-plesiochronic data signal is composed of a multiplexer stage which groups the n-digital signals into a sum signal and of a demultiplexer stage which, in turn, resolves the sum signal into n-digital signals. The method with which the bit rates of the plesiochronic digital signals are adapted to the bit rate of the sum signal is known as pulse stuffing. A known method for this purpose is the positive-zero-negative stuffing of the CCITT recommendation G.702.

In the multiplexer stage of a digital signal transmission equipment, a synchronous data signal and an additional data signal are generated from the incoming plesiochronic data signal. When the bit rates of the plesiochronic and of the synchronous data signals, i.e. the appertaining plesiochronic or, respectively, sychronous clock sequence deviate from one another, then a stuffing procedure is required from time-to-time. When the bit rate of the plesiochronic signal is lower than that of the synchronous data signal, then an additional data bit is gated into the synchronous data signal from time-to-time or, respectively, one bit from the plesiochronic data signal is transmitted twice. When the bit rate of the plesiochronic data signal is higher than that of the synchronous data signal, then a data bit is removed from the plesiochronic data signal from time-to-time and is not transmitted in the synchronous data signal, but in the additional data signal. The additional data signal contains what are referred to as code words which signal the demultiplexer stage of the receiving digital signal transmission equipment that point in time at which a data bit must be removed from the synchronous data signal or, respectively, at which the data bit transmitted in the additional data signal must be inserted into the synchronous data signal. Upon utilization of the plesiochronic clock sequence recovered at the receiving side the plesiochronic data signal is recovered from the synchronous data signal on the basis of the insertion or, respectively, excision of a data bit or, respectively, of what is referred to as a purge bit.

Since the stuffing information in the form of specific code words is only transmitted once via the additional data signal, it can easily be falsified. Given nonrecognition, due to disturbed data transmission as the loss of synchronism of a data signal must be recognized at the dislocation of the frame word. For this reason, the stuffing instruction must be made far more resistant to error in radio transmission due to possible pulse disturbances.

The plesiochronic clock sequence must be reacquired in the demultiplexer of the receiving digital signal transmission equipment. For this purpose, a switch is undertaken to a somewhat slower or to a somewhat faster clock following a stuffing event for a respective compensation interval, dependent on whether stuffing was carried out positively or negatively. This method results in high jitter and a clock smoothing circuit is required for the elimination thereof.

The German published application No. 32 01 965, fully incorporated herein by this reference, discloses a digital signal transmission apparatus in which the additional data signal contains the momentary phase relationship between the plesiochronic clock sequence and the synchronous clock sequence as a binary phase word. For the purpose of recovering the plesiochronic clock sequence in the demultiplexer of the receiving digital signal transmission equipment from this binary phase word, a sum clock is withdrawn via a regenerator and via a divider, a reference data clock, a signal having $2^k$ times the frequency of an auxiliary clock as well as a load pulse being capable of being generated from the sum clock via a phase control loop. In order to generate the clock sequence which is plesiochronic with respect to the reference data clock, a plesiochronic auxiliary clock is first acquired again and mixed with the sum clock, so that the desired plesiochronic clock sequence can be filtered from the signal mix via a filter.

It is conceivable to transmit these words in the additional data singal with such a high repetition frequency that two successive phase words can only differ in the least significant bit places.

SUMMARY OF THE INVENTION

The object of the present invention is to provide a method by which a plesiochronic signal can be formed from the received sum signal in the demultiplexer of a digital transmission system, even given what are referred to as pulse disturbances on the transmission circuit.

The above object is achieved, in particular, in the system of the type set forth above, which is particularly characterized in that the stuffing information is composed exclusively of phase words which, in digital form, contain the momentary phase relationship between the sum signal and the plesiochronic data signal, whereby the repetitious frequency of the phase words, given finer value gradation in the sum signal, is selected of such a magnitude that two successive phase words can, at most, differ in the least significant bit. The invention is also particularly characterized in that the phase words are evaluated in a command evaluation stage, whereby the command evaluation stage emits control signals to the format converter when the extreme values of the phase words are exceeded, bits being inserted into the synchronous data signal or being purged from the synchronous data signal by way of control signals.

The resistance to disruption is further increased in that the most significant phase bit is multiply transmitted, since falsifications of individual bits of the phase word exert no influence on the switch-over potential by way of which bits are inserted into or, respectively, purged from the synchronous data signal.

The greater jitter is prevented in that respectively only one clock pulse with respect to the clock insertion/purging is inserted into or, respectively, purged from the plesiochronic clock sequence, particularly when a plurality of bits or, respectively, more significant bits of the phase word are falsified.

BRIEF DESCRIPTION OF THE DRAWINGS

Other objects, features and advantages of the invention, its organization, construction and operation will be best understood from the following detailed description, taken in conjunction with the accompanying drawings, on which:

FIGS. 3 and 4 illustrate binary states shown in a tabular form for the explanation of the command evaluation stage illustrated in FIG. 2;

DESCRIPTION OF THE PREFERRED EMBODIMENTS

Figure 1:
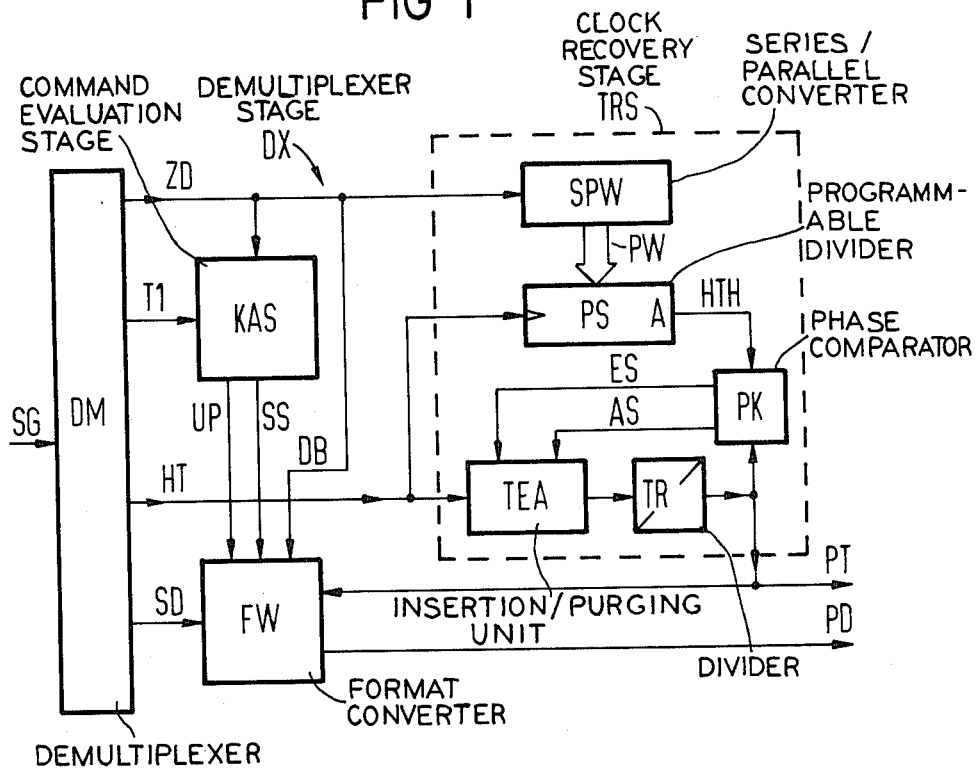
FIG. 1 is a block circuit diagram of a demultiplexer for the implementation of the method of the present invention.

FIG. 1 illustrates a demultiplexer stage DX of a digital transmission system. The demultiplexer stage DX comprises a known demultiplexer DM at which the sum signal SG received by the digital transmission equipment is received and which outputs an additional data signal ZD, a synchronous data signal SD, as well as a first clock sequence T1 and an auxiliary clock sequence HT.

The demultiplexer stage DX further comprises a known format converter FW which generates a plesiochronic data signal PD from the synchronous data signal SD. This occurs, for example, in a known manner in that what is referred to as a normal and what is referred to as a delayed data signal (delayed by half a data bit) are generated in the format converter FW from the synchronous data signal SD. By switching between the normal and the delayed data signal at defined points in time, the purge bit contained in the synchronous data signal SD can be purged or, respectively, the data bit DB transmitted in the additional data signal SD can be inserted into the synchronous data signal.

Applied to the format converter FW or a data bit DB contained in the additional data signal ZD as well as a switching potential UP and a stuffing signal SS. The latter are output from a command evaluation stage KAS. The first clock sequence T1 and the additional data signal ZD are applied to the command evaluation stage KAS. Finally, a plesiochronic clock signal PT is also applied to the format converter FW, this plesiochronic clock sequence PT being acquired in a clock recovery stage TRS.

The clock recovery stage TRS contains a series-to-parallel converter SPW to which the additional data signal ZD is applied and also contains a clock insertion/purging unit TEA to which the auxiliary clock sequence HT is also applied. The clock recovery stage TRS further contains a programmable divider PS at which a phase word PW, output by the series-to-parallel converter SPW, is applied in parallel form. The auxiliary clock HT output by the demultiplexer DM is applied to the clock input of the programmable divider stage PS from whose output A a further auxiliary clock sequence HTH is transmitted to a phase comparator PK. The plesiochronic clock sequence PT which is output by the clock insertion/purging unit TEA via a divider TR is applied to the other inputs (not eferenced) of the phase comparator PK. The phase comparator PK forwards an overlay or insert signal ES and an extract or purge signal AS to the clock insertion/purging unit.

Figure 2:
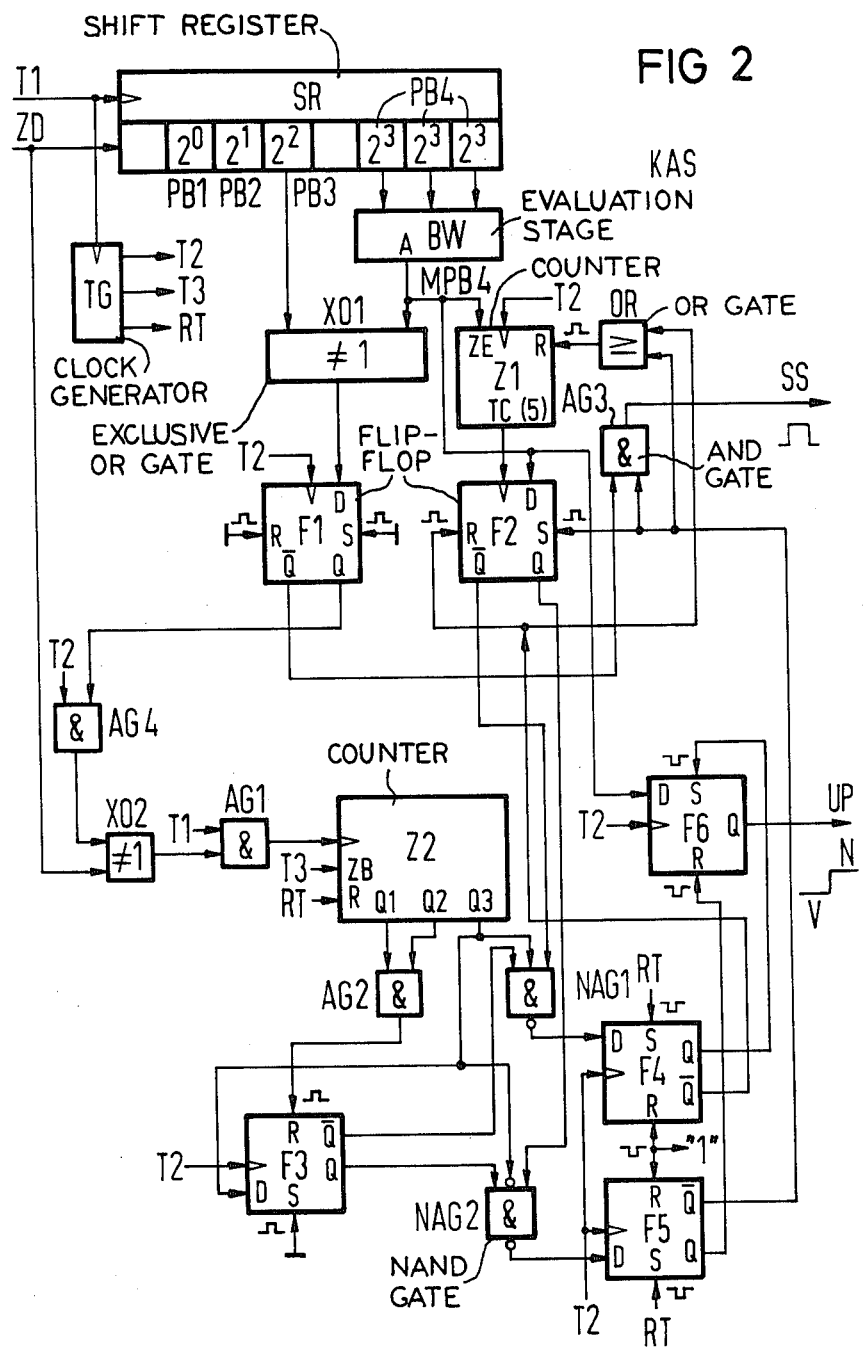
FIG. 2 is a schematic representation of a command evaluation stage which may be employed in practicing the present invention.

FIG. 2 illustrates a command evaluation stage KAS. The first clock sequence T1 is applied to the clock inputs of a shift register SR and of a clock generator TG. The clock generator TG emits a second and a third clock sequence T2, T3, as well as a reset clock sequence RT whose pulse curves shall be set forth below with reference to FIG. 5. The shift register SR comprises, for example, eight memory locations which, as illustrated in FIG. 2, are occupied with a first, a second and a third phase bit PB1–PB3, as well as with three fourth phase bits PB4. The first four phase bits PB1–PB4, whereby the fourth phase bit PB4 is the most significant, form the phase word PW contained in the additional data signal ZD.

The three fourth phases PB4 are applied to an evaluation stage BW whose output A is connected to an input of a first EXCLUSIVE OR gate XO1. The third phase bit PB3 is applied to the other input of the the first EXCLUSIVE 0R gate XO1, whose output is connected to an input D of a first delay flip-flop F1.

The output A of the evaluation stage BW is connected to a counting direction input ZE of a first counter Z1, to an input D of a second delay flip-flop F2, and to an input D of a sixth delay flip-flop F6. The second clock sequence T2 is respectively applied to the clock inputs of the first and the sixth delay flip-flops F1 and F6. The reset and the set instruction input RS of the first delay flip-flop F1 are respectively connected to a reference potential, i.e. they are switched inactive.

A carry output TC of the first counter Z1 is connected to the clock input of the second delay flip-flop F2. An output Q of the first delay flip-flop F1 is connected to the one input of a fourth AND gate AG4 at whose other input the second clock sequence T2 is applied. The output of the fourth AND gate AG4 is connected to one input of a second XOR gate XO2 at whose other input the additional data ZD are applied. The output of the second XOR gate XO2 is connected to the one input of a first AND gate AG1 at whose other input the first clock sequene T1 is applied and the output of this gate is connected to the clock input of a second counter Z2.

The third clock sequence T3 is applied to the count instruction input ZB of the counter Z2 and the reset clock sequence RT is connected to the reset input R of the second counter Z2. The second counter Z2 comprises first through third outputs Q1–Q3, whereby the first output Q1 is the least significant output and the third output Q3 is the most significant output. The first and second outputs Q1 and Q2 of the second counter Z2 are connected to the inputs of a second AND gate AG2 whose output is connected to a reset instruction input R of a third delay flip-flop F3. The second clock sequence T2 is applied to the clock inputs of a third through sixth delay flip-flops F3–F6. The set instruction input S of the third delay flip-flop F3 is connected to a reference potential, i.e. is switched inactive.

The third output Q3 of the second counter Z2 is connected to the input D of the third delay flip-flop F3, to an input of a first NAND gate NAG1, and to an inverting input of a second NAND gate NAG2. The output Q of the third delay flip-flop is connected to the other input of the second NAND gate NAG2 and the inverting output $\bar{Q}$ of the third delay flip-flop F3 is connected to the other input of the first NAND gate NAG1. The inverting output $\bar{Q}$ of the second delay flip-flop F2 is connected to a further input of the first NAND gate NAG1 and the output Q of the second delay flip-flop F2 is connected to a further input of the second NAND gate NAG2.

The output of the first NAND gate NAG1 is connected to the input D of the fourth delay flip-flop F4 and the output of the second NAND gate NAG2 is connected to the input D of the fifth delay flip-flop F5. The reset clock sequence RT is respectively applied to the set instruction inputs S of the fourth delay flip-flop F4 and the fifth delay flop F5 and a potential corresponding to the logical "1" level is respectively connected to the reset instruction inputs R of the fourth delay flip-flop F4 and the fifth delay flip-flop F5, i.e. these inputs are connected inactive.

The output Q of the fourth delay flip-flop F4 is connected to a set instruction input S and the output of the fifth delay flip-flop F5 is connected to the reset instruction input R of the sixth delay flip-flop F6. The inverting output $\bar{Q}$ of the fourth delay flip-flop F4 is connected to the reset instruction input R of the second delay flip-flop F2 and, via an OR gate OR, is connected to the reset instruction input R of the first counter Z1. The inverting output $\bar{Q}$ of the fifth delay flip-flop F5 is connected to the set instruction input S of the second delay flip-flop F2, is connected to the one input of a third AND gate AG3 and is likewise connected via the OR gate OR to the reset instruction input R of the first counter Z1. The other input of the third AND gate AG3 from whose output the stuffing signal SS is output, is connected to the inverting output $\bar{Q}$ of the first delay delay flip-flop F1. The switching potential UP is output from the output Q of the sixth delay flip-flop F6.

The first through third delay flip-flops F1–F3, as well as the first counter Z1, are realized by CMOS modules, i.e., their reset or, respectively, set instruction inputs RS are activated by a logical "1". The fourth through sixth delay flip-flops F4–F6 are realized by TTL modules, i.e. their reset or, respectively, set instruction inputs R, S are activated by a logical a logical "0" level.

In tabular form, FIG. 3 illustrates the relationships between the phase bits PB1–PB4 of the phase word PW contained in the additional data ZD and the signal a the output A of the evaluation stage BW and the signal at the output (not referenced in detail) of the first XOR gate XO1. The evaluation stage BW forms a majority decision regarding the fourth phase bits MPB4 and therefore emits that potential at its output A which comprises the majority of the fourth phase bits PB4 applied at its inputs. Given the phase words PW=0–PW=7, that is a logical "0" level, and, given the phase words PW=8–PW=15, that is a logical "1" level. A modulo-2 addition between the third phase bit PB4 and the majority decision of the fourth phase bit MPB4 is carried out in the first XOR gate XO1. This yields a logical "0" for the phase words PW=12–PW=3 and yields a logical "1" level for the phase words PW=4–PW=11, whereby the phase words PW are cyclically traversed in upward or, respectively, downward direction between the two maximum values PW=0–PW=15. The values of the first through third phase bits PB1–PB3 which are placed in brackets at the phase words PW=4–PW=11 shall be discussed below.

Figure 4:
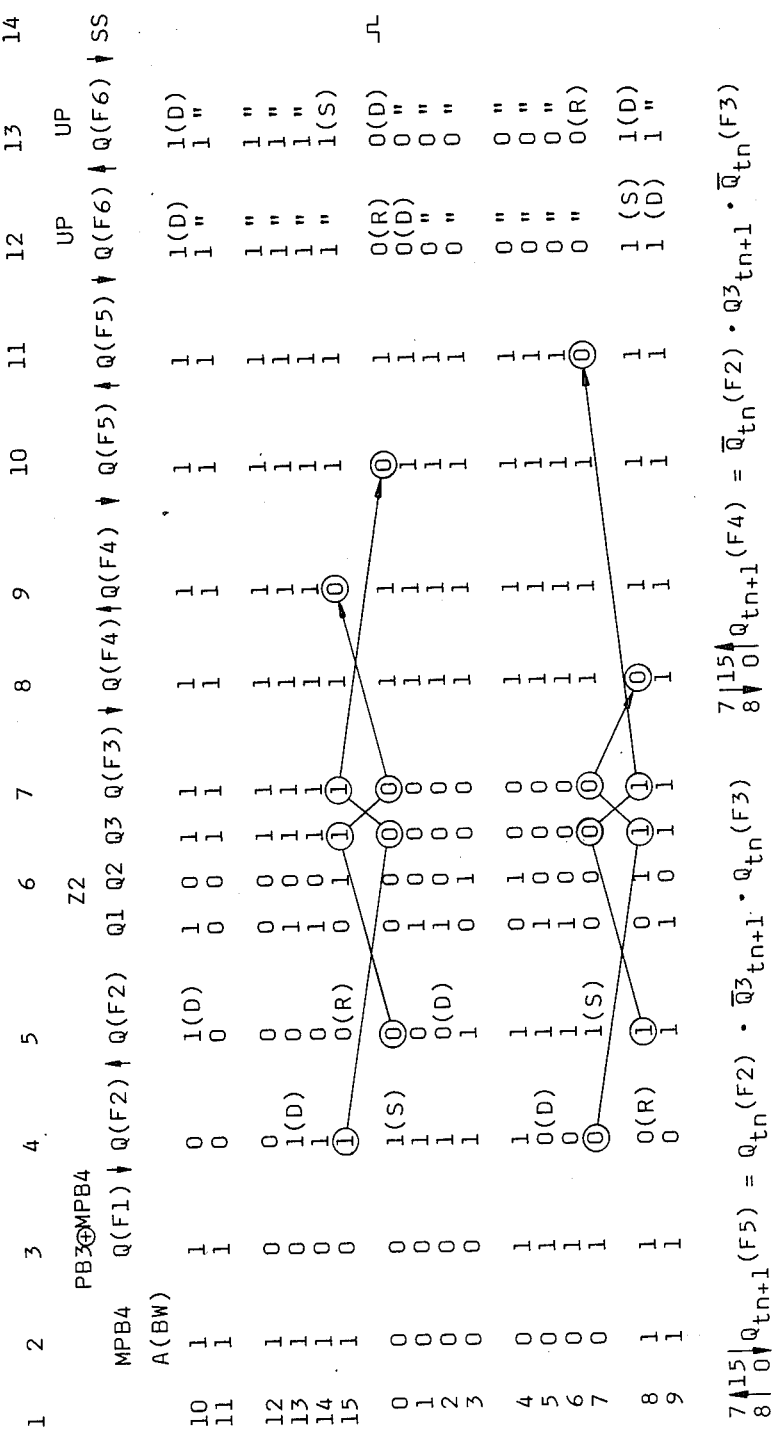

FIG. 4 illustrates the logic states that can be taken at some outputs of the command evaluation stage KAS illustrated in FIG. 2, dependent on the value of the phase word PW. In detail, these are the phase words PW in column 1, the majority decision of the fourth phase bits MPB4, which can be taken at the output A of the evaluation stage PW, in the second column, the potential which can be taken at the output Q of the first delay flip-flop F1 in column 3, this potential corresponding to the modulo-2 addition of the third phase bit PB3 with the majority decision of the fourth phase bits MPB4. Furthermore, these are the potentials at the first through third outputs Q1–Q3 of the second counter Z2 in column 6, the potential of the output Q of the third delay flip-flop F3 in column 7, and the synchronizing signal SS in column 14.

It has been assumed below that the phase word PW cyclically traverses the values 0, 1–15, i.e. skips from the value 15 to the value 0. The following potentials have been shown for this purpose: that at the output of the second delay flip-flop F2 in column 4, that at the output Q of the fourth delay flip-flop F4 in column 8, that at the output Q of the fifth delay flip-flop F5 in column 10, and that at the output sixth delay flip-flop F6 from which the switching potential UP is output in column 12. It has been assumed below that the phase word PW cyclically traverses the values 15, 14–0, i.e. skips from the value 0 to the value 15. The following potentials have been shown in this regard: that at the output Q of the second delay flip-flop F2 in column 5, that at the output Q of the fourth delay flip-flop F4 in column 9, that at the output Q of the fifth delay flip-flop F5 in column 11, and that at the output of the sixth delay flip-flop F6 from which the switching potential UP is output in column 13.

The arrows point up or, respectively, point down shown in individual columns indicate the skips of the phase word PW from the value 15 or respectively, vice-versa. The arrow pointing down thereby refers to the skip of the phase word PW from the value 15 to the value 0 and the arrow pointing up thereby refers to the skip of the phase word PW from the value 0 to the value 15. The command evaluation stage KAS illustrated in FIG. 2 can also evaluate the transitions of the phase word PW from the value 7 to the value 8 or, respectively, vice-versa, this to be discussed in greater detail later.

Figure 5:
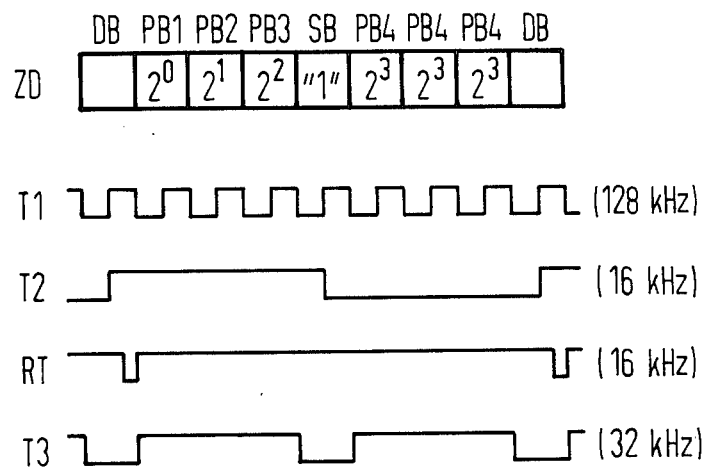
FIG. 5 is an illustration of the structure of the additional data signal, as well as the shape of the sum data sequences.

FIG. 5 illustrates a portion of the serial additional data ZD. In the additional data signal ZD, therefore, the data bit DB, three times the fourth phase bit PB4, a synchronzing bit SB, the third through first phase bits PB3-PB1, and, furthermore, the same cycle beginning with the data bit DB ar therefore successively transmitted. The first clock sequence T1, which, for example comprises a pulse repetition frequency of 128 kHz comprises a rising signal edge, for example, in the middle of each bit. The second clock sequence T2 which, for example, comprises a pulse repetition frequency of 16 kHz, therefore, comprises a rising signal edge in the middle of each data bit and comprises a falling signal edge in the middle of the synchronizing bit SB. The reset clock sequence RT, which likewise comprises a pulse repetition frequency of 16 kHz comprises a short negative pulse following, for example, each rising signal edge in the second clock sequence T2. The third clock sequence T3 which, for example, comprises a pulse repetition frequency of 32 kHz assumes a potential corresponding to the logical "0" level during the duration of a data bit DB and during the duration of the synchronizing bit SB and otherwise assumes the potential corresponding to the logical "1" input level.

Figure 6:
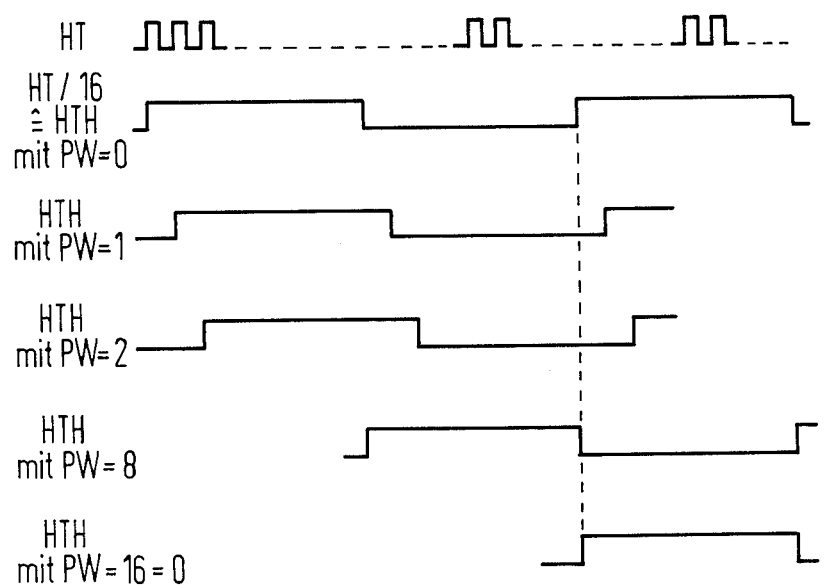
FIG. 6 is a pulse chart illustrating a few data signals for the purpose of explaining the operation of a clock recovery stage contained in the demultiplexer.

The uppermost line in FIG. 6 shows the auxiliary clock HT output by the demodulator DM. Given a phase word PW that can assume 16 different values, the value of the pulse repetition frequency of the auxiliary clock sequence HP is 16 times the value of the bit rate of the synchronous data signal SD.

The following lines show the further auxiliary clock sequence HTH output by the programmable divider stage PS dependent on the value of the applied phase word PW. The pulse repetition frequency of the further auxiliary clock sequence HTH thereby nominally corresponds to the value of the bit rate of the synchronous data signal SD. As illustrated in FIG. 6, the rising signal edge of the further auxiliary clock sequence HTH is respectively shifted towards the right by one pulse duration of the auxiliary clock sequence HT when the value of the phase word PW increases by a single step.

The operation of the command evaluation stage KAS shown in FIG. 2 shall be set forth below with reference to FIGS. 3–5.

In the clock generator TG, the second clock sequence T2 and the third clock sequence T3, as well as the reset clock sequence RT, these comprising the pulse shape illustrated in FIG. 5, are generated from the first clock sequence T1.

The additional data ZD are written into the bit locations of the shift register SR with the first clock sequence T1. With the rising signal edge of the second clock sequence T2, the phase word PW, i.e. the phase bits PB1-PB4, located in the shift register SR are evaluated. The evaluation stage BW emits that potential at its output A that the majority of fourth phase bits PB4 applied to its inputs assume. Therefore, the evaluation stage BW emits a logical "1" or, respectively, a logical "0" when at least two of the three applied fourth phase bits PB4 have a logical "1" value or, respectively, a logical "0" value. As illustrated in FIG. 3, the majority decision of the fourth phase bits MPB4 is a logical "0" at the output A of the evaluation stage BW during the phase words PW=0-PW=7 and is a logical "1" during the phase words PW=8-PW=15. The precondition for this is that, at most, one of the four phase bits PB4 is falsified.

A modulo-2 addition between the third phase bit PB3 and the majority decision of the fourth phase bits MPB4 occurs in the first XOR gate XO1. As shown in FIG. 3, the result is a logical "1" during the phase words PW=4-PW=11 and is a logical "0" during the phase words PW=12-PW=3.

With the rising signal edge of the second clock sequence ST2, the output signal of the first XOR gate XO1, i.e. the modulo-2 addition of the third phase bit PB3 with the majority decision of the four phase bits MPB4, is transferred into the first delay flip-flop F1. With each rising signal edge of the second clock sequence T2, the first counter Z1 which is realized by a bidirectional counter, changes its counter reading by the value "1". For example, the counter reading is incremented by the value "1" when a logical "1" is applied to the counter direction input ZE and the counter reading is deincremented by the value "1" when a logical "0" is applied to the count direction input ZE. The carry output TC of the first counter Z1 outputs a positive signal edge when the counter reading has reached its extreme value, for example +5, when counting up and −5 when counting down. The second delay flip-flop F2 is triggered with this signal edge at the carry output TC and the logical state of the majority decision of the fourth phase bits MPB4 is transferred into the second delay flip-flop F2. The second delay flip-flop F2 therefore then contains the logical state of the majority decision of the fourth phase bits MPB4 when these assume the same logical state five times or, correspondingly, more frequently, when respectively more than one of the three phase bits PB4 is falsified, i.e. when the majority decision of the fourth phase bits MPB4 is falsified.

With the next rising signal edge of the second clock sequence T2, the logic state of the majority decision of the fourth phase bits MPB4 is transferred into the sixth delay flip-flop F6 and is output from the output Q thereof as a switching potential UP. For example, a logical "1" thereby corresponds to the normal data signal in the format converter FW and a logical "0" corresponds to the data signal in the format converter FW.

In this manner, the logical state of the majority decision of the fourth phase bits MPB4 defines the logical state of the switching potential UP until what is referred to as a command, i.e. a transition of the phase word PW between the values 0 and 15 or, respectively, the values 7 and 8 is recognized by the modules shown in the lower hal of FIG. 2. When a command is recognized, the switching potential UP is defined via the set or, respectively, the reset instruction input S, R of the sixth delay flip-flop F6.

Given transition of the phase word PW from the value 15 to the value 0, i.e. the bit rate of the plesiochronic data signal PD is higher than the bit rate of the synchronous data signal SD, or, respectively, given transition of the value 8 to the value 7, i.e. the bit rate of the plesiochronic data signal PD is lower than the bit rate of the synchronous data signal SD, a switch from the normal to the delayed data signal is undertaken in the format converter FW.

Analogous thereto, a switch from the delayed to the normal data signal is undertaken in the format converter FW given transition of the phase word PW, from the value 0 to the value 15, i.e. the bit rate of the plesiochronic data signal PD is lower than that of the synchronous data signal SD or, respectively, given transition from the value 7 to the value 8, i.e. the bit rate of the plesiochronic data signal PD is higher than the bit rate of the synchronous data signal SD.

In addition, the stuffing signal SS, i.e. for example, a positive pulse, is output upon transition of the phase word PW from the value 15 to the value 0, as shall be set forth in yet greater detail below. What is thereby effected is that the data signal DB transmitted in the additional data signal ZD is inserted (stuffed) into the synchronous data signal SD.

The switching from the delayed data signal to the normal data signal in the format converter FW, given transition of the phase word from the value 0 to the value 15, causes a bit, what is referred to as the purge bit, to be excised, or, respectively, purged in the synchronous data signal SD.

The modules for the evaluation of the "command" shown in the lower half of FIG. 2 shall be set forth below.

The second counter Z2 and the following assembly serve the purpose of evaluating the transitions of the phase word between the values 0 and 15 and between the values 7 and 8. These transitions must be recognized with particular reliability since a data bit DB which is not inserted or which is incorrectly inserted or, respectively, a purge bit which is not removed from the synchronous data signal SD leads to a longer error series of the plesiochronic data signal PD.

The second XOR gate XO2 is used so that the second counter Z2 can evaluate both the transition of the phase word PW between the values 0 and 15 and between the values 7 and 8. The phase words PW between the values 12-13 are transmitted, unaltered, via tne second XOR gate XO2 (see FIG. 3). Given the phase words PW between the values 4-11, the respectively first through third phase bits PB1-PB3 are repolarized by the second XOR gate XO2 (see the values in brackets in FIG. 3). This occurs in the following manner.

During the phase words PW having the values 12-3, a logical "0" is applied at the fourth AND gate AG4 proceeding from the output Q of the first delay flip-flop F1, so that the output signal of the fourth AND gate AG4 is also a logical "0". This logical "0" is also applied to the second XOR gate XO2, so that the phase word PW contained in the additional data signal ZD is transmitted, unaltered, to the first AND gate AG1. During the values 4-11 of the phase word PW, a logical "1" is applied to the fourth AND gate AG4 proceeding from the output Q of the first delay flip-flop F1. The second clock sequence T2 is applied to the other input of the fourth AND gate AG4, so that, while the second clock sequence T2 assumes a logical "1", this logical "1" is transmitted to the second XOR gate XO2 from the output of the fourth AND gate AG4. For example, during the values 4-11 of the phase word PW, the first through third phase bits PB1-PB3 are transmitted to the first AND gate AG1 with transposed polarity.

A logical AND operation is carried out in the first AND gate AG1 between the phase word PW output by the second XOR gate XO2 and the first clock sequence PW. The output of the first AND gate AG1 therefore emits a logical "0" to the clock input of the second counter Z2 when the bits of the phase word PW output by the second XOR gate XO2 are a logical "0". The first AND gate AG1 emits pulses when the appertaining bits of the phase word PW output by the second XOR gate XO2 are a logical "1" or, respectively, contained logical "1's".

What the third clock sequence T3, applied to the count instruction input ZB of the second counter Z2, causes is that the data bit and the synchronizing bit SB in the additional data signal ZD have no influence on the counter reading of the second counter Z2. By way of the reset clock sequence RS, at the reset instruction input R of the second counter Z2, for example, this is set to "0" after each evaluation of a phase word PW.

Referring to column 6 of FIG. 4, the various counter readings are illustrated that can be taken at the outputs Q1-Q3 of the second counter Z2, these being shown dependent on the respectively evaluated phase word PW. It has been assumed that none of the phase bits PB1-PB4 in the phase word PW were falsified. Since the first output Q1 and the second output Q2 of the second counter Z2 do not simultaneously transmit a logical "1" to the second AND gate AG2 at any value of the phase word PW, a logical "0" is always applied to the reset instruction input R of the third delay flip-flop F3. As a result thereof, the potential at the output Q or, respectively, the potential at the inverting output $\bar{Q}$ of the third delay flip-flop F3 due to the potential applied to the input D of the third delay flip-flop F3 is defined proceeding from the third output Q3 of the second counter.

Carried out in the first NAND gate NAG1 are a logical NAND operation between the potential at the inverted output $\bar{Q}$ of the second delay flip-flop F2 at the time tn, and the potential of the third output Q3 of the second counter Z2 at the time tn+1, and the potential at the inverted output e,ovs/Q/ of the third delay flip-flop F3 at the time tn. The inverted operation result is applied to the input D of the fourth delay flip-flop F4 and defines the output potential thereof at the time tn+1.

At the time tn or, respectively, tn+1 reference is made to the respective evaluation of the phase words PW=n or, respectively, PW=n+1. Due to the gate transit times, a logical state that is determined by the evaluation of the phase words PW=n can be taken at the output Q or, respectively, at the inverted output Q of the third delay flip-flop F3 at a rising edge of the second clock sequence T2 at the time tn+1. Simultaneously, a logic state which is determined by the evaluation of the phase word PW=n+1 is applied at the input D of the of the third delay flip-flop F3 at the time tn+1. This logical state appears at the output Q of the flip-flop at the time tn+1+dt, whereby dt is the gate transit time of the flip-flop.

A logical AND operation is carried out in the second NAND gate NAG2 between the potential at the output Q of the second delay flip-flop F2 at the time tn, the inverter potential at the third output Q3 of the second counter Z2 at the time tn+1, and the potential at the output Q of the third delay flip-flop F3 at the time tn. The inverted operation result is applied to the input D of the fifth delay flip-flop F5 and defines the output potential thereof at the time tn+1.

These two logical operations are illustrated in FIG. 4 in terms of equations. The fourth delay flip-flop F4 thereby evaluates the skips of the phase word PW from the value 0 to the value 15 and from the value 7 to the value 8. The fifth delay flip-flop F5 evaluates the skips of the phase word PW from the value 15 to the value 0 and from the value 8 to the value 7. These operations shall be set forth in yet greater detail below.

As shown in FIG. 4, column 7, the output Q of the third delay flip-flop F3 outputs a logical "0" during the phase words PW=0-PW=7 and outputs a logical "1" during the phase words PW=8-PW=15. This occurs regardless of whether the phase words PW are traversed in ascending or descending sequence.

In FIG. 4, the logical states are entered at those terminals of the command evaluation stage KAS illustrated in FIG. 2 which are important for an understanding thereof. For the transitions of the phase word PW between the values 0 and 15 or, respectively, 7 and 8, the respective logic states relative for the recognition of the transition, i.e. of the command, are provided with circles and are connected to one another by way of a polygonal stroke.

The transitions of the phase word PW between the values 0 and 15 or, respectively, 7 and 8 shall be set forth in greater detail below. These transitions, as well as the behavior of the command evaluation stage KAS at the other values of the phase word PW can be derived from FIG. 4. In some columns of FIG. 4, the terminals—input D, set or respectively, reset instruction input S, R—by way of which the appertaining delay flip-flop was switched are indicated in brackets (next to the logical state values).

In the following, a first case shall be assumed in which the phase word PW traverses the values 0–15 in ascending sequence, i.e. the bit rate of the plesiochronic data signal PD is higher than the bit rate of the synchronous data signal SD. In addition to columns 1-3, 6 and 7, the columns 4, 8, 10, 12 and 14 are relevant for this case in FIG. 4, i.e. the columns in which an arrow pointing down is entere. This arrow refers to the skip of the phase word PW from the value 15 to the value 0.

As already presented, the transition of the phase word PW from the value 15 to the value 0 is evaluated in the fifth delay flip-flop F5. At this transition, three logical "1"s (the logical "1" from the third output Q of the second counter Z2 is inverted) are applied for the first time at the second NAND gate NAG2 at the time tn+1 with n=15, i.e. with n+1=0. With the next rising signal edge of the second clock sequence T2, the output Q or respectively, the inverted output $\overline{Q}$ of the fifth delay flip-flop F5 are set to a logical "0" or, respectively, a logical "1". As a result thereof, the output Q of the sixth delay flip-flop F6 is set to a logical "0" by way of its reset instruction input R, i.e. the switching potential UP is set to a logical "0" (i.e. the switch to the delayed data signal is undertaken in the format converter FW, as illustrated in FIG. 1). Simultaneously, the output Q of the second delay flip-flop F2 is set to a logical "1" via its set instruction input S. By way of the third AND gate AG3, at which a logical "1" from the inverted output $\overline{Q}$ of the first delay flip-flop F1, and a logical "1" from the inverted output $\overline{Q}$ of the fifth delay flip-flop F5 are applied, furthermore, a positive pulse is simultaneously output as a stuffing signal SS. The positive pulse is caused by the setting of the inverted output $\overline{Q}$ of the fifth delay flip-flop F5 to a logical "0", since a negative pulse proceeding from the reset clock sequence RT is applied at the setting instruction input S of the fifth delay flip-flop F5 shortly after the rising signal edge of the second clock sequence T2.

Finally, the counter reading of the first counter Z1 is also set to a logical "0".

As is already set forth above, the counter reading of the first counter Z1 is continuously lowered in single steps beginning with the phase word PW=0 due to the majority decision of the fourth phase bits MPB4=0. Given the extreme counter reading −5 of the first counter Z1, the carry output TC thereof outputs a rising signal edge, so that a logical "0" appears at the output Q of the second delay flip-flop F2 at the phase word PW=5.

As already set forth, the transition of the phase word PW from the value 7 to the value 8 is evaluated in the fourth delay flip-flop F4. At this transition, three logical "1"s (the inverted outputs $\overline{Q}$ of the second and third flip-flops F2, F3 are applied) are applied for the first time at the first NAND gate NAG1 at the time tn+1 with n=7, i.e. with n+1=8. With the next rising signal edge of the clock sequence T2, the output Q or, respectively, the inverted output $\overline{Q}$ of the fourth delay flip-flop F4 are set to a logical "0" or, respectively, a logical "1". As a result thereof, the output Q of the sixth delay flip-flop F6 is set to a logical "1" via its set instruction input S, i.e. the switching potential UP is set to a logical "1" (a switch to the normal dta signal is undertaken in the format converter FW (see FIG. 1). At the same time, the output Q of the second delay flip-flop F2 is set to a logical "0" via its reset instruction input R. Finally, the counter reading of the first counter Z1 is also set to 0.

As was already set forth above, the counter reading of the first counter Z1 is continuously incremented in single steps with the phase word PW=8 being incremented due to the majority decision of the fourth phase bits MPB4=1. At the extreme counter reading +5 of the first counter Z1, the carry output TC thereof outputs a rising signal edge, so that a logical "1" appears at the output Q of the second delay flip-flop F2 at the phase word PW=13.

A second case shall be assumed below in which the phase word PW traverses the value 15 through to the value 0 in descending sequence, i.e. the bit rate of the plesiochronic data signal PD is lower than the bit rate of the synchronous data signal SD. In addition to columns 1-3, 6 and 7, columns 5, 9, 11 and 13 in FIG. 4 are relevant for this case, i.e. the columns in which an arrow pointing up is entered. This arrow refers to the skip of the phase word PW from the value 0 to the value 15.

As already presented, the transition of the phase word from the value 0 to the value 15 is evaluated in the fourth delay flip-flop F4. At this transition, three logical "1"s (the inverted outputs $\overline{Q}$ of the second and third delay flip-flops F2, F3 are applied) are applied at the first NAND gate NAG1 at the time tn+1 with n=0, i.e. n+1=15. With the next rising signal edge of the second clock sequence T2, the output Q, or respectively, the inverted output $\overline{Q}$ of the fourth delay flip-flop F4 are set to a logical "0" or, respectively, a logical "1". As a result thereof, the output $\overline{Q}$ of the sixth delay flip-flop F6 is set to a logical "1" via its setting instruction input S, i.e. the switching potential UP is set to a logical "1" (for example, a switch to the normal data signal is undertaken at the format converter FW, see FIG. 1).

At the same time, the output Q of the second delay flip-flop F2 is set to a logical "0" via its reset instruction input R. Finally, the counter reading of the first counter Z1 is also set to 0.

As was already set forth above, the counter reading of the first counter Z1 is continuosly incremented in single steps beginning with the phase word PW=15 due to the majority decision of the fourth phase bits MPB4=1. At the extreme counter reading +5 of the first counter Z1, the carry output TC thereof outputs the rising signal edge, so that a logical "1" appears at the output Q of the second delay flip-flop F2 at the phase word PW=10.

Also as already presented above, the transition of the phase word PW from the value 8 to the value 7 is evaluated in the fifth delay flip-flop F5. In this transition, three logical "1" (the logical "1" from the third output of the second counter Z2, is inverted) are applied for the first time at the second NAND gate NAG2 at the time $t_n+1$ with $n=8$, i.e. $n+1=7$. With the next rising signal edge of the second clock sequence T2, the output Q or, respectively, the inverted output $\overline{Q}$ of the fifth delay flip-flop F5 are set to a logical "0" or, respectively, to a logical "1". As a result thereof, the output Q of the sixth delay flip-flop F6 is set to a logical "0" by way of the reset instruction input R thereof, i.e. the switching potential UP is set to a logical "0" (for example a switch to the delayed data signal is undertaken at the format converter FW, see FIG. 1). At the same time, the output of the second delay flip-flop F2 is set to a logical "1" via its setting instruction input S. Finally, the counter reading of the first counter Z1 is also set to 0.

As was set forth above, the counter reading of the first counter Z1 is continuously incremented in single steps beginning with the phase word PW=7 on the basis of the majority decision of the fourth phase bits MPB4=0. Given the extreme counter reading −5 of the first counter Z1, the carry output TC thereof outputs a rising signal edge, so that a logical "0" appears at the output of the second delay flip-flop F2 at the phase word PW=2.

As was also set forth above, the switching potential UP at the output Q of the sixth delay flip-flop F6 is determined by the majority decision of the fourth phase bits MPB4 applied to the input D thereof in those cases in which no command is evaluated in the command evaluation stage KAS, i.e. in those cases in which the phase word PW does not carry out a transition between the values 0 and 15 or, respectively, 7 and 8. In these cases, a D is entered in parentheses in column 13 of FIG. 4 following the corresponding logic states.

The operation of the command evaluation stage KAS shown in FIG. 2 shall be explained in brief below.

The command evaluation stage KAS emits the switching potential UP by way of which the switching between the normal and the delayed data signal is controlled in the format converter FW (see FIG. 1). This switching occurs between the values 0 and 15, as well as between the values 7 and 8 of the phase word PW.

Due to the utilization of the second XOR gate XO2, the same evaluation circuit can be employed for both transitions in what is referred to as multiplex operation. At least three significant bits (first through third phase bits PB1–PB3) are repolarized in the corresponding work area.

Given operating conditions in which no phase word changes occur, i.e. the bit rates of the plesiochronic and of the synchronous data signals PD, SD are identical to one another, the majority decision of the most significant, multiply transmitted (fourth) phase bits PB4 are additionally evaluated for the switching operation.

The recognition of a transition or, respectively, of a command is protected by even further measures. Before each command, the mean value with respect to the majority, i.e. the majority decision of the fourth phase bits MPB4, must assume a defined state, for example, a logical "1" given transition of the phase word PW from the value 15 to the value 0 (see column 4 in FIG. 4).

A further transition of the phase word PW in the opposite sense must have been recognized before the command (see column 7 in FIG. 4). A command is therefore only evaluated when all preconditions have been met.

Incorrect instructions are avoided with great reliability in this manner. In case a transition or, respectively, a command is nonetheless not recognized, the change in the polarity of the majority decision of the fourth phase bits MPB4 (see column 2 of FIG. 4) is employed for switching between the normal and the delayed data signal.

In this case, the instruction for inserting the data bit DB into the synchronous data signal SD is suppressed in the format converter FW, so that one bit of the synchronous data signal SD is therefore doubly transferred into the plesiochronic data signal PD.

Comments on the error resistance of the command evaluation stage KAS shown in FIG. 2 will be set forth below.

The majority decision of the fourth phase bits MPB4, executed in the evaluation stage BW, is insensitive to falsifications of respectively one of the fourth phase bits MB4. As a result of what is referred to as the "integration" of the majority decision of the fourth phase bits MPB4 in the first counter Z1, the command evaluation is also insensitive given falsification of a plurality of fourth phase bits MPB4 in the phase word PW.

Up to three bits of the phase word PW can be falsified in the evaluation of the command. Only given four falsified bits, for example at the phase word PW=15, does the third output Q3 of the second counter output a logical "0" instead of a logical "1".

The clock recovery stage TRS illustrated in FIG. 1 shall be set forth below with reference to FIG. 6.

The first through fourth phase bits PB1–PB4 of the phase word PW are brought into a parallel form in the series-to-parallel converter SPW and are transmitted to the programmable divider stage PS. As was already set forth with reference to FIG. 6, the auxiliary clock sequence HT output by the demultiplexer DM is divided down in the programmable divider stage PS, for example being divided down to the value 16, whereby the rising signal edge of the further auxiliary clock sequence HTH output by the programmable divider stage PS is chronologically offset dependent on the value of the phase word PW.

The further assemblies of the clock recovery stage TRS serve the purpose of avoiding larger phase skips of the plesiochronic clock sequence PT. Given falsification of more significant phase bits PB1–PB4, in particular, of the phase word PW, larger, sudden changes of the phase relationship of the clock edges of the plesiochronic clock sequence PT occur. This is prevented by way of the clock overlaying/extracting circuit TEA. For example, within two pulses of the auxiliary clock sequence HT, only one pulse can be inserted or, respectively, extracted in the clock overlaying/extracting circuit TEA. The clock overlaying/extracting circuit TEA is driven by the phase comparator PK which compares the phase relationship of the further auxiliary clock sequence HTH to the phase relationship of the auxiliary clock sequence HT, divided down by a division factor of 16. When the phase comparator PK identifies a phase difference between these two signals, one pulse is mixed into the auxiliary clock sequence HTH or respectively, extracted therefrom, in the clock overlaying/extracting circuit TEA via the overlaying signal ES or respectively, extraction signal AS. A very low jitter of the plesiochronic clock sequence PT is assured as a result thereof.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for recovering a plesiochronic data signal responsive to a sum signal, in a demultiplexer stage of a digital signal transmission equipment utilizing pulse stuffing techniques is divided into a synchronous data signal and into an additional data signal in a demultiplexer and a data bit transmitted in the additional data signal is inserted into the synchronous data signal in a format converter on the basis of a stuffing information transmitted in the additional data signal or, respectively, a bit is extracted from the synchronous data signal, and a plesiochronic clock sequence is formed in a clock recovery stage, the plesiochronic data signal being read from the format converter with the plesiochronic clock sequence, the improvement comprising the steps of:

forming the stuffing information exclusively of digital phase words containing the momentary phase relationship between the sum signal and the plesiochronic data signal, including selecting the repetition frequency of the phase words given finer value gradation in the sum signal which is of such a magnitude that two successive phase words can at most differ in the least significant bit; and evaluating the phase words in a command evaluation stage and emitting control signals to the format converter when the extreme values of the phase words are exceeded to cause the format converter to selectively insert or purge data bits from the synchronous data signal.

2. The improved method of claim 1, and further defined by the step of:

multiply transmitting the most significant bit of the phase words.

3. The improved method of claim 2, and further defined by the step of:

generating a potential in an evaluation circuit of the command evaluation stage, which potential corresponds to the majority of the most significant bits of the phase word, the potential representing one of the control signals that is employed for inserting or purging bits from the synchronous data signal.

4. The improved method of claim 3, and further defined by the steps of:

generating a normal data signal and generating a delayed data signal which is delayed by half a bit in the format converter from the synchronous data signal, whereby the insertion or purging of bits in the synchronous data signal is caused by switching between the normal and the delayed data signals at the predetermined extreme values of the phase word, the logic state of the switching potential corresponding to the normal or to the delayed data signal.

5. The improved method of claim 4, and further comprising the steps of:

integrating the output potential of the evaluation circuit over a plurality of phase words to meet a first criterion when a predetermined value is reached;

evaluating an upward transgression of a predetermined extreme value over all bits of the phase word to meet a second criterion when a transition is recognized;

evaluating the first and second criteria to meet a third criterion when, before an upward transgression of the extreme value or of the mean value, the upward transgression of a mean value or of an extreme value is recognized; and setting the switching potential to the value correspnding to the transition of the phase word when all three criteria are met.

6. In a method for recovering a plesiochronic data signal in a demultiplexer stage of a digital transmission equipment, in which a received sum signal generated in a transmitting digital signal transmission equipment utilizing the pulse stuffing technique is divded into a synchronous data signal and into an additional data signal in a demultiplexer and in which a data bit transmitted in the additional data signal is inserted into the synchronous data signal in a format converter on the basis of a stuffing information transmitted in the additional data signal or a bit is purged from the synchronous data signal, and in which a plesiochronic clock sequence is formed in a clock recovery stage, the plesiochronic data signal being read from the format converter with the plesiochronic clock sequence, the improvement comprising the steps of:

generating a first auxiliary clock sequence in the demultiplexer and generating a second auxiliary clock sequence in the clock recovery stage from the first auxiliary clock sequence by way of a programmable divider stage such that the pulse repetition frequencies of the second auxiliary clock sequence and of the plesiochronic clock sequence are identical to one another and the pulse repetition frequency of the first auxiliary clock sequence is identical to the pulse repetition frequency of the second auxiliary clock sequence multiplied by a value gradation number;

determining the value gradation number by the plurality of different values which a phase word can assume;

generating the plesiochronic clock sequence from the first auxiliary clock sequence via a clock overlaying/extracting circuit and a divider;

comparing the phase relation of the second auxiliary clock sequence to that of the plesiochronic clock sequence in a phase comparator; and in response to a deviation inserting or extracting one pulse signal edge with the pulse overlaying/extracting circuit.

7. An apparatus for recovering a plesiochronic data signal in a demultiplexer stage of a digital signal transmission equipment responsive to a sum signal utilizing pulse stuffing techniques is divided into a synchronous data signal and into an additional data signal in a demultiplexer and a data bit transmitted in the additional data signal is inserted into the synchronous data signal in a format converter on the basis of a stuffing information transmitted in the additional data signal or, respectively, a bit is extracted from the synchronous data signal, and a plesiochronic clock sequence is formed in a clock recovery stage, the plesiochronic data signal being read from the format converter with the plesiochronic clock sequence, the improvement comprising:

means for forming the stuffing information exclusively of digital phase words containing the momentary phase relationship between the sum signal and the plesiochronic data signal, including selecting the repetition frequency of the phase words given finer value gradation in the sum signal which is of such a magnitude that two successive phase words can at most differ in the least significant bit; and means for evaluating the phase words in a command evaluation stage and emitting control signals to the format converter when the extreme values of the phase words are exceeded to cause the format converter to selectvely insert or purge data bits from the synchronous data signal.

8. The apparatus of claim 7, and further defined as comprising:

a first AND gate for converting the logical "1's" in the phase word into pulses; and a counter connected to said first AND gate and including a plurality of outputs, and operable to produce a maximum or a minimum counter reading at its outputs in accordance with the predetermined extreme value of the phase word in a bit-by-bit evaluation of the phase word.

9. The apparatus according to claim 8, and further defined as comprising:

a first delay flip-flop;

a second AND gate connected to said first delay flip-flop;

an EXCLUSIVE OR gate connected to said second AND gate; said first delay flip-flop, said second AND gate and said EXCLUSIVE OR gate operable to repolarize the least significant bits of the phase word in a limited region about the mean value of the phase word such that the transgression of the mean value is evaluatable with the same circuit as the transition between the predetermined extreme values.

10. The apparatus of claim 9, and further defined as comprising:

a third AND gate connected to said outputs of said counter; and a third delay flip-flop connected to said third AND gate, whereby the least significant bits of said counter are applied to said third AND gate and the output potential of said second delay flip-flop can be determined so that a predetermined plurality of falsified bits in the phase word do not effect an incorrect output potential of the second delay flip-flop.

* * * * *